United States Patent Office 3,235,514
Patented Feb. 15, 1966

3,235,514
PREPARATION OF COPPER CHROMATE CONTAINING CATALYTIC PELLETS
Tsutomu Kuwata, Tokyo, Shizuo Takumi, Kamakura-shi, Kanagawa-ken, Takeo Takahashi, Yokohama-shi, Kanagawa-ken, and Satoshi Abe, Tokyo, Japan, assignors to Nikki Kagaku Kabushiki Kaisha, Tokyo, Japan, a corporation of Japan
No Drawing. Filed July 31, 1962, Ser. No. 213,616
4 Claims. (Cl. 252—467)

The present invention relates to a process of producing the catalysts of copper-chromium oxide series, which comprises treating copper oxide or copper compound such as copper hydroxide, copper carbonate or copper formate with a sufficient chemically equivalent amount of chromic acid to convert all or part of copper oxide or other copper compounds into copper chromate and to form copper chromate or a mixture of copper oxide and copper chromate, or copper chromate and said copper salt; or decomposing copper ammonium chromate $NH_4CuCrO_4$ to copper-chromium oxide at a temperature about 350° C., and treating said copper-chromium oxide with more or less than one equivalent amount of chromic acid to convert a part or whole of copper oxide or a part of copper oxide contained in said copper-chromium oxide into copper chromate.

The purpose of this invention resides in establishing a simple process to produce highly activated pellets form catalysts having high hardness and selectivity.

It is a well-known fact that both copper oxide and copper-chromium oxide catalysts have milder activity and higher selective hydrogenating activity as compared with a nickel catalyst and therefore the use of this catalyst is developing in various fields of industry.

In the case of reducing carboxylic groups of a fatty oil with a nickel catalyst, the reduction proceeds too far so that most of the concerned groups are converted into hydrocarbon radicals, and the alcohol intermediates are not obtained. The catalyst of either copper oxide or copper-chromium oxide series, however, enables one to suppress the reaction at the alcohol producing stage.

When nickel is employed as the catalyst in reducing the benzene ring, the hydrogenation of the benzene ring is carried out easily while copper oxide or copper-chromium oxide catalysts are not suitable for such reaction. Therefore when nitrobenzene is reduced in the presence of a nickel catalyst, the hydrogenation reaction proceeds too far to convert the nitrobenzene to aniline and cyclohexylamine. Whereas either of the latter catalysts employed for the same purpose conveniently enables one to suppress the reaction at the desired stage and to obtain aniline with high yield from nitrobenzene.

When acetylene is produced through partial oxidation of methane according to Sachsse's method, the residual gas after isolation of the product is found to contain still a small amount of acetylene although the ratio of hydrogen and carbon monoxide in the product gases is proper for synthesizing methanol. For removing this acetylene, catalytic hydrogenation is one of the most convenient methods. If nickel is used as the catalyst for this purpose, it readily promotes the hydrogenation of carbon monoxide to methane undesirably; whereas the catalysts of copper-chromium oxide series is desirable for this purpose, because only the hydrogenation of acetylene is selectively occurred.

According to the recent development of petro-chemistry, we have been able to obtain ethylene gas easily through cracking of naphtha fraction. Ethylene has various applications as a raw material to synthesize organic compounds. However, a small amount of acetylene is always contained as an impurity in ethylene gas obtained by said process and it must be completely removed because it causes harm to the reactions of ethylene. In these cases the catalysts of copper-chromium oxide series show higher selectivity against acetylene, hydrogenation of ethylene to ethane does not occur before that of acetylene.

When a copper oxide catalyst or a copper-chromium oxide catalyst is used as a catalyst for hydrogenation of a non-volatile substance at a low temperature such as fatty oil, it may be used as a powder, but when it is used in hydrogenation of a relative volatile substance such as benzene it is desirable to use a pelletized catalyst, since in such form a continuous hydrogenation can be carried out.

Unfortunately it is found to be difficult to pelletize such powdered catalysts into tablets or pellets, so that they are usually shaped into tablets or pellets with the aid of water glass as a binder, or supported on pumice as carrier also with water glass (as disclosed in Bidlack Office Tech. Services Rept. P.B. 208, 9 (1945); Japanese patent application publication No. 8,230/1960 to Yuki and Miyake). However, when thus shaped catalysts are employed, introduction of undesirable by-product in the reaction product is unavoidable since the water glass has a strong alkaline nature.

As a result of the devoted study in order to remove above described defects of the prior art catalyst, the new catalysts well serving the purpose have been invented as follows: copper oxide or copper compound such as copper hydroxide, copper carbonate or copper formate is treated with less than one equivalent amount of chromic acid, to convert a part of copper oxide or said copper salts into copper chromate, thereby to obtain a mixture of copper oxide and copper chromate or the corresponding copper salts and copper chromate; or otherwise, copper ammonium chromate is decomposed at a temperature about 350° C. into copper chromium oxide, then treated with one equivalent or less amount of chromic acid to convert a part or whole of copper oxide contained in said copper-chromium oxide into copper chromate, which can easily be formed in tablets or pellets by the usual method. The thus obtained catalysts of the copper-chromium oxide series, in which the copper chromate acts as a binder, have desirable hardness and excellect selectivity.

In catalysts of this invention, besides copper and chromium, manganese compounds may be added. Suitable ratios of copper, chromium and manganese of this catalyst range between 45:50:5 to 35:60:5.

In the following examples, the process of preparing the catalysts of the present invention will be illustrated in detail as well as their applications.

EXAMPLE 1

In a reaction vessel 100 g. of copper oxide prepared by precipitation was placed and to it 80 g. of 50% aqueous solution of chromic acid was poured slowly. A part of the copper oxide was converted into copper chromate. The mixture was kneaded and then formed into pellets by an extruder or after drying the above reacted mixture ground and blended with 2 to 3% of water and about 5% of graphite, and then formed by a conventional tablet machine into small tablets 3 by 3 mm.

EXAMPLE 2

100 g. of oxides of copper, chromium and manganese prepared according to the process of Japanese Patent No. 200,077 was placed in a reaction vessel and mixed slowly with 75 g. of 40% aqueous chromic acid. The copper oxide contained in an amount of about 13% of the oxides of copper, chromium and manganese was converted into copper chromate. The resulting mixture was then dried, ground and formed into tablets of about 3 x 3 mm.

The solid catalysts prepared according to Examples 1 and 2 of this invention were used for hydrogenation of various materials as in the following descriptions.

hyde was hydrogenated into butyl aldehyde in said reaction tube. The conditions and products of the hydrogenation are as follows:

Table 2

| Run No. | Reaction temp. (° C.) | Molar ratio of crotonaldehyde to hydrogen | Liquid space velocity (LHSV) | Croton- aldehyde (percent) | Butyl aldehyde (percent) | Crotyl alcohol (percent) | Butanol (percent) |
|---|---|---|---|---|---|---|---|
| 1 | 150–160 | 1:1.5 | 0.3 | 8.7 | 76.8 | 3.2 | 11.1 |
| 2 | 170–180 | 1:1.5 | 0.4 | 4.7 | 80.2 | 2.9 | 11.9 |

EXAMPLE 3

The copper-chromium oxide catalyst prepared according to the process of Example 1 was placed in a hard glass reaction tube 22 mm. in diameter and 400 mm. in length. The volume of the catalyst layer was 50 cc. The tube charged with catalyst was treated with hydrogen at 200° C. for about 24 hours and then hydrated crotonaldehyde was hydrogenated at the same temperature in this reaction tube to yield butyl alcohol. The rate of crotonaldehyde passed through the catalyst layer was 10 cc. per hour in liquid state; and its molar ratio to the amount of hydrogen was 1:10. Butyl alcohol was obtained under these conditions with the yield higher than 99.5%. The reaction product contained neither crotonaldehyde nor its polymer. This product was neutral and did not contain free butyric acid.

EXAMPLE 4

The tablets of the oxides of copper, chromium and manganese prepared as in the description of Example 2 were placed in a hard glass reaction tube 22 mm. in diameter and 400 mm. in length, the volume of the catalyst layer being 25 cc. After the treatment of this reaction tube with hydrogen at 200° C. for about 24 hours, nitrobenzene was fed through this tube to hydrogenate it into aniline. The conditions and products of this hydrogenation process are listed in Table 1.

Table 1

| Run No. | Reaction temp. (° C.) | Molar ratio of nitrobenzene to hydrogen | Liquid space velocity of nitrobenzene (LHSV) | Aniline (percent) |
|---|---|---|---|---|
| 1 | 180 | 1:30 | 0.6 | 98 |
| 2 | 200 | 1:30 | 0.6 | 100 |
| 3 | 230 | 1:30 | 0.6 | 100 |
| 4 | 260 | 1:30 | 0.6 | 100 |
| 5 | 300 | 1:30 | 0.6 | 100 |

The initial hardness of the catalyst used in these runs was 110 kg./cm.$^2$, which increased after use in these reactions to 310 kg./cm.$^2$.

EXAMPLE 5

100 g. of the oxides of copper, chromium and manganese produced in accordance with Japanese Patent No. 200,077 was mixed in a reaction vessel with 50 g. of diatomaceous earth and then slowly added 75 g. of 40% aqueous solution of chromic acid in order to convert the copper oxide contained into copper chromate. The resultant mixture was dried, ground, formed into tablets 3 by 3 mm. and packed in a hard glass reaction tube 22 mm. in diameter and 400 mm. in length. The volume of the catalyst layer was 50 cc. After the treatment of catalyst with hydrogen at 200° C. for about 24 hours, hydrated crotonaldehyde In this case, compounds of higher boiling point were found in the amount less than 0.5% of the product. The content of these compounds was decreased to 0.1% by mixing butanol in the amount less than 50% with crotonaldehyde.

The conditions under which crotonaldehyde was almost quantitatively hydrogenated to butanol in the presence of this catalyst are as follows:

Reaction temperature _____ 170–200° C.
Molar ratio of crotonaldehyde to hydrogen _____ 16–10
Liquid space velocity (LHSV) _____ About 0.4

EXAMPLE 6

The tablets of oxides of copper, chromium and manganese prepared according to the process of Example 2 were treated with hydrogen at 200° C., and the raw material gas mixture for the synthesis of methanol, containing 66% of hydrogen, 33% of carbon monoxide and 1% of acetylene, was passed through said catalyst at the temperature of 80 to 200° C. with the liquid space velocity (LHSV) of 1000. As a result, neither acetylene nor methane was found in the resultant gas, showing that acetylene was completely eliminated from the reaction gas and no methane was produced during the hydrogenation. Thus the catalyst of this invention does not oxidize any carbon monoxide to methane as nickel catalyst does, rendering the gas mixture the most suitable one for the synthesis of methanol.

EXAMPLE 7

Ethylene gas prepared through cracking of naphtha fraction always contains a small amount of acetylene, which causes harm to various kinds of organic syntheses in which ethylene is used as a raw material. At present, palladium, cobalt-molybdenum, nickel-cobalt-chromium catalysts are used for this hydrogenation; however, the removal of acetylene has not been sufficient. The solid catalysts of oxides of copper, chromium and manganese of the present invention are also useful for this purpose. The following results were obtained employing the catalyst.

Table 3

[Catalyst used: Mixture of asbestos and oxides of copper, chromium and manganese oxide without free copper oxide in the ratio of 2:1, treated with hydrogen at 200° C.]

| Conditions | A | B |
|---|---|---|
| Temperature, °C | 200 | 200 |
| Pressure, kg./cm.$^2$ | 15 | (¹) |
| Gas-stream velocity l./hr. (N.T.P.) | 27.3 | 27.4 |
| Space velocity (SV) | 960 | 970 |
| Residence time, sec | 13.3 | 0.8 |
| Molar ratio: (H$_2$:C$_2$H$_2$) | 3.02:1 | 2.76:1 |

¹ Atmospheric pressure.

Table 3—Continued

[The compositions of the starting gas and the gas after reaction (results of gas-chromatographical analysis)]

| Components, vol. percent | Starting gas | A | | B | | |
|---|---|---|---|---|---|---|
| | | Reaction gas after having reacted for— | | Starting gas | Reaction gas after having reacted for— | |
| | | 2 hrs. | 40 hrs. | | 4 hrs. | 40 hrs. |
| $H_2$ | 3.02 | 0.04 | 0.01 | 2.70 | 0.39 | 1.30 |
| $CH_4$ | | | | | | |
| $C_2H_2$ | 1.00 | ¹1 ppm | ¹1 ppm | 0.98 | ¹1 ppm | ¹1 ppm |
| $C_2H_4$ | 29.52 | 27.03 | 28.14 | 93.84 | 93.53 | 94.46 |
| $C_2H_6$ | 0.07 | 2.42 | 2.22 | 0.03 | 1.24 | 0.36 |
| 1-$C_4H_8$ | | 0.05 | 0.05 | | 0.05 | 0.05 |
| Trans-2-$C_4H_8$ | | (²) | (²) | | (²) | (²) |
| Cis-2-$C_4H_8$ | | (²) | (²) | | (²) | (²) |
| $N_2$ | 66.39 | 66.39 | 66.39 | 2.45 | 2.45 | 2.45 |

¹ P.p.m.  ² Trace.

As is apparent in the above result, the catalyst of this invention, under atmospheric or low hydrogen pressure, has excellent selectivity and does not hydrogenate ethylene to ethane so long as hydrogenation of acetylene has not been completed.

The following are the results given for comparison obtained using a girdler G-24 catalyst (molybdenum-cobalt series).

Table 4

Conditions of the reaction:

Temperature _____ 260° C.
Pressure _____ 15 kg./cm.²
Gas - stream velocity l./hr.
  (N.T.P.) _____ 12.9.
Space velocity (SV) _____ 450.
Residence time _____ 29.2.
Molar ratio ($H_2:C_2H_2$) ___ 3.2:1.
Catalyst _____ Molybdenum-cobalt series.

[The compositions of the starting gas and the reaction gas (results of gas-chromatographical analysis)]

| Components, vol. percent | Starting gas | Reaction gas after having been reacted for— | |
|---|---|---|---|
| | | 2 hrs. (at temp. 200° C.) | 24 hrs. |
| $H_2$ | 3.14 | 3.04 | 2.66 |
| $CH_4$ | | | |
| $C_2H_2$ | 0.98 | 0.80 | 0.31 |
| $C_2H_4$ | 29.77 | 29.90 | 30.06 |
| $C_2H_6$ | 0.07 | 0.13 | 0.15 |
| 1-$C_4H_8$ | | | Trace |
| Trans-2-$C_4H_8$ | | | |
| Cis-2-$C_4H_8$ | | | |
| 1,3-$C_4H_6$ | | | Trace |
| $N_2$ | 66.04 | 66.04 | 66.04 |

The above results show that the acetylene content does not appreciably decrease as in the case of using the catalyst of this invention in the hydrogenation of ethylene.

What we claim is:

1. A process for preparing a selective hydrogenation catalyst which comprises reacting a copper compound selected from a group consisting of copper oxide, copper hydroxide, copper carbonate and copper formate with less than a chemically equivalent amount of a solution of chromic acid to convert a part of said copper compound into copper chromate, thereby to obtain a mixture of copper oxide and copper chromate, then shaping this mixture into tablets using said copper chromate as a binder.

2. A process for preparing a selective hydrogenation catalyst which comprises pyrolyzing copper ammonium chromate at a temperature of about 350° C. to produce copper-chrominum oxide mixture, then treating said mixture with less than a chemically equivalent amount of a solution of chromic acid to convert a part of copper oxide in the mixture into copper chromate, then making tablets of this mixture using said copper chromate as a binder.

3. A process for the preparation of a selective hydrogenation catalyst which comprises reacting a compound, selected from the class of copper oxide, copper hydroxide, copper carbonate and copper formate, and a manganese oxide with a solution of chromic acid, the reactants being taken in such proportions that the ratio of the respective copper, chromium and manganese in the resulting mixture will range from 45:50:5 to 35:60:5, and pelleting said resulting mixture using copper chromate as a binder.

4. A process for the preparation of a selective hydrogenation catalyst which comprises pyrolyzing a coprecipitate of oxides of copper, manganese and chromium at a temperature of about 350° C., treating said oxide mixture with less than a chemically equivalent amount of a solution of chromic acid, to convert copper oxide contained in said mixture into copper chromate wherein the reactants are taken in such proportions that the ratio of copper, chromium and manganese in the resulting catalyst will range from 45:50:5 to 35:60:5, removing solid material from the liquid, drying and then pelleting said resulting mixture using said copper chromate as a binder.

References Cited by the Examiner

UNITED STATES PATENTS

| | | | |
|---|---|---|---|
| 1,853,771 | 4/1932 | Larson | 252—476 |
| 1,889,672 | 11/1932 | Larson | 252—467 X |
| 1,964,000 | 6/1934 | Lazier | 252—467 X |
| 2,031,475 | 2/1936 | Frazer | 252—467 X |
| 2,265,682 | 12/1941 | Bennett et al. | 252—458 |
| 2,791,613 | 5/1957 | Pray et al. | 252—467 X |
| 2,861,106 | 11/1958 | Opitz et al. | 252—467 X |
| 2,871,253 | 1/1959 | Swearingen | 260—449.6 |
| 2,900,395 | 8/1959 | Guest et al. | 252—467 |
| 2,910,444 | 10/1959 | Cramer | 252—467 |
| 2,917,531 | 12/1959 | Kolbel et al. | 260—449.6 |
| 2,951,816 | 9/1960 | Hogan et al. | 252—467 |
| 2,965,562 | 12/1960 | Gardner | 252—467 X |
| 3,020,291 | 2/1962 | Dunlop et al. | 252—467 X |
| 3,129,235 | 4/1964 | Kuwata et al. | 252—467 X |

OTHER REFERENCES

Connor et al.: "The Preparation of Copper-Chromium Oxide Catalysts for Hydrogenation," J.A.C.S., vol. 54, January–June 1932, page 1143.

BENJAMIN HENKIN, *Primary Examiner.*

MAURICE A. BRINDISI, *Examiner.*